United States Patent [19]

Ito et al.

[11] Patent Number: 4,907,625
[45] Date of Patent: Mar. 13, 1990

[54] REFREGERANT TRANSPORTING HOSE

[75] Inventors: Hiroaki Ito; Koji Akiyoshi, both of Inuyama, Japan

[73] Assignee: Tokai Rubber Industries, Ltd., Aichi, Japan

[21] Appl. No.: 287,150

[22] Filed: Dec. 21, 1988

[30] Foreign Application Priority Data

Dec. 28, 1987 [JP] Japan ................................. 62-333601
Dec. 28, 1987 [JP] Japan ................................. 62-333600

[51] Int. Cl.⁴ ............................................. F16L 11/08
[52] U.S. Cl. ..................................... 138/126; 138/125; 138/137; 428/36.1; 428/36.2; 428/36.8; 428/36.91; 428/215; 428/475.8; 428/492; 428/494
[58] Field of Search ..................... 428/36.1, 36.2, 36.9, 428/36.8, 215, 475.8, 492, 494; 138/126, 125, 124, 137; 525/183, 184

[56] References Cited

U.S. PATENT DOCUMENTS

| Re. 30,322 | 7/1980 | Hammer et al. | 525/183 |
| 2,564,602 | 9/1948 | Hurst | 138/127 |
| 2,800,145 | 5/1953 | Peierls et al. | 138/137 |
| 3,528,260 | 8/1968 | Binder | 138/126 |
| 4,017,557 | 4/1977 | Hammer et al. | 525/183 |
| 4,209,042 | 6/1980 | Buan | 138/126 |
| 4,330,017 | 5/1982 | Satoh et al. | 138/126 |
| 4,567,235 | 1/1986 | Sasaki et al. | 525/113 |
| 4,567,238 | 1/1986 | Sasaki et al. | 525/183 |
| 4,612,222 | 9/1986 | Gaitskell | 525/183 |
| 4,633,912 | 1/1987 | Pilkington | 428/36.2 |
| 4,661,563 | 4/1987 | Sasaki | 525/184 |
| 4,707,528 | 11/1987 | Koizumi | 525/184 |
| 4,803,247 | 2/1989 | Altman | 525/179 |

FOREIGN PATENT DOCUMENTS 61-14285 1/1986 Japan .

*Primary Examiner*—Ellis P. Robinson
*Assistant Examiner*—Archene A. Turner
*Attorney, Agent, or Firm*—Oliff & Berridge

[57] ABSTRACT

A refrigerant transporting hose having an inner tube; an outer tube of a rubber material located radially outwardly of the inner tube; and a reinforcing fiber layer interposed between the inner and outer tubes, such that the reinforcing fiber layer and the inner and outer tubes constitute an integral tubular body, the inner tube including a resinous layer formed of a blend of modified polyolefine and polymaide resin. Alternatively, the inner tube includes a resinous layer formed of a reaction product of polyamide, and polyolefine whose molecular chain has a pair of functional groups at both ends thereof. The hose has a high flexibility as well as a high resistance to gas permeation therethrough.

9 Claims, 2 Drawing Sheets

REFREGERANT TRANSPORTING HOSE

BACKGROUND OF THE INVENTION

1. Field of the Invention

The present invention relates to a refrigerant transporting hose and particularly to such hoses suitable for use as piping for car coolers, air conditioners and the like which are employed in automotive vehicles.

2. Discussion of the Prior Art

Referring to FIG. 9, there is shown a known hose for transporting or conducting refrigerant gas such as Freon (fluorohydrocarbon). The hose has a three-laminated or layered structure consisting of an inner and an outer rubber tube 201 and 203 and a reinforcing fiber layer 202 interposed between the inner and outer tubes 201, 203. The inner rubber tube 201 is formed of acrylonitrile-butadiene rubber (NBR), chlorosulfonated polyethylene (CSM) or the like, the reinforcing fiber layer 202 is formed of polyester fiber or the like, and the outer rubber tube 203 is formed of ethylene propylene diene rubber (EPDM), chloroprene rubber (CR) or the like. Reference numerals 215 designate spiking holes which are formed through the outer rubber tube 203 so as to communicate the reinforcing fiber layer 202 with outside space. The spiking holes 215 serve to relieve the refrigerant (Freon) which has permeated the inner rubber tube 201, into the outside space, thereby preventing the hose from being swollen due to the refrigerant otherwise trapped between the intermediate fiber layer 202 and the inner and/or outer rubber tubes 201, 203. Thus, the hose is free from the problem of separation or peeling at the interfaces between the three laminates (one layer 202 and two tubes 201, 203) due to the trapped refrigerant. Being formed of rubber material except for the reinforcing fiber layer 202, the hose has a high flexibility. Accordingly, the hose can be handled with ease, for example to provide rubber piping. Moreover, the rubber hose can be connected with high gas tightness to a nipple or other joints. Rubber material, however, has a comparatively high gas permeability, that is, a comparatively low resistance to gas permeation therethrough. Therefore, the rubber hose suffers from the problem of leakage of the refrigerant gas conveyed therethrough, especially where Freon, whose molecular weight is comparatively low, is used as the refrigerant.

Referring to FIG. 10, there is shown another known refrigerant transporting hose including an innermost resin layer 304 formed of polyamide resin, such as nylon 6, which has a high resistance to gas permeation. The innermost polyamide resin layer 304, and a rubber layer 305 formed of a rubber material such as NBR and located radially outwardly of the polyamide resin layer 304, correspond to the inner rubber tube 201 of the hose of FIG. 9. The hose further includes a reinforcing fiber layer 302 formed on the outer surface of the rubber layer 305 and an outer rubber tube 303 formed on the outer surface of the fiber layer 302. Reference numerals 315 designate spiking holes similar to those 215 of the hose of FIG. 9. Having the polyamide resin layer 304 having a high resistance to gas permeation, the hose does not permit leakage of the refrigerant gas even if the molecular weight of the gas is comparatively low. However, since polyamide resin is a very rigid material, the overall flexibility of the hose is deteriorated due to the use of the rigid polyamide resin layer 304. On the other hand, if the thickness of the polyamide resin layer 304 is reduced to increase the flexibility of the hose, then the resistance to gas permeation of the hose is deteriorated.

As is apparent from the foregoing, none of the conventional refrigerant transporting hoses are satisfactory in quality.

SUMMARY OF THE INVENTION

It is therefore an object of the present invention to provide a refrigerant transporting hose which has a high flexibility together with a high resistance to gas permeation therethrough.

According to a first aspect of the present invention, there is provided a refrigerant transporting hose comprising (a) an inner tube; (b) an outer tube of a rubber material located radially outwardly of the inner tube; and (c) a reinforcing fiber layer interposed between the inner and outer tubes, such that the reinforcing fiber layer and the inner and outer tubes constitute an integral tubular body, the inner tube including a resinous layer formed of a blend of modified polyolefin and polyamide resin.

The inventors have conducted a series of studies for providing a more flexible layer containing polyamide resin; which layer is suitable for the inner tube of a refrigerant transporting hose. Those studies revealed that, if a blend material of modified polyolefin and polyamide resin is used for forming a layer for the inner tube of a refrigerant transporting hose, then the layer has a high flexibility as well as a high resistance to gas permeation.

In one embodiment of the hose in accordance with the first aspect of the present invention, a ratio by weight of the modified polyolefin to the polyamide resin of the blend is within a range of 30/70 to 70/30.

In another embodiment of the hose in accordance with the first aspect of the invention, the modified polyolefin is a copolymer of olefin monomer and ethylenically unsaturated carboxylic acid or its derivative. The modified polyolefin may be graft copolymer of polyolefin and ethylenically unsaturated carboxylic acid or its derivative, or a reaction product of polyolefin and carboxylic acid or its derivative.

In yet another embodiment of the hose in accordance with the first aspect of the invention, the polyamide resin comprises nylon 6, nylon 66 or nylon 6-nylon 66 copolymer.

In another embodiment of the hose in accordance with the first aspect of the invention, the inner tube consists of a plurality of layers including the resinous layer and at least one rubber layer.

In yet another embodiment of the hose in accordance with the first aspect of the intention, the inner tube consists of a single layer constituted by the resinous layer.

In a further embodiment of the hose in accordance with the first aspect of the invention, the resinous layer of the inner tube has a thickness of 0.1 to 2.5 mm, more advantageously, 0.4 to 0.8 mm.

According to a second aspect of the present invention, there is provided a refrigerant transporting hose comprising (a) an inner tube; (b) an outer tube of a rubber material located radially outwardly of the inner tube; and (c) a reinforcing fiber layer interposed between the inner and outer tubes, such that the reinforcing fiber layer and the inner and outer tubes constitute an integral tubular body, the inner tube including a resinous layer formed of a reaction product of polyamide, and polyolefin whose molecular chain has a pair of functional groups at both ends thereof.

In the studies for producing a more flexible layer containing polyamide which is suitable for the inner tube of a refrigerant transporting hose, the inventors have found that, if a reaction product of polyamide and polyolefin whose molecular chain has a pair of functional groups at both ends thereof, is used for forming such layers, then the hose has a high flexibility as well as a high resistance to gas permeation.

In one embodiment of the hose in accordance with the second aspect of the present invention, the inner tube consists of a plurality of layers including the resinous layer and at least one rubber layer.

In another embodiment of the hose in accordance with the second aspect of the invention, the inner tube consists of a single layer constituted by the resinous layer.

In yet another embodiment of the hose in accordance with the second aspect of the invention, the reaction product is selected from the group of block copolymer and graft copolymer each of which is produced by using the polyolefin and the polyamide.

In a preferred embodiment of the hose in accordance with the second aspect of the invention, a ratio by weight of the polyolefin to the polyamide is within a range of 30/70 to 70/30.

In a further embodiment of the hose in accordance with the second aspect of the invention, the polyolefin comprises polyethylene, polypropylene or ethylene-propylene copolymer.

In another embodiment of the hose in accordance with the second aspect of the invention, the polyamide comprises nylon 6, nylon 66 or nylon 6-nylon 66 copolymer.

In yet another embodiment of the hose in accordance with the second aspect of the invention, the resinous layer of the inner tube has a thickness of 0.1 to 2.5 mm, more advantageously, 0.4 to 0.8 mm.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENTS

Figure 1:
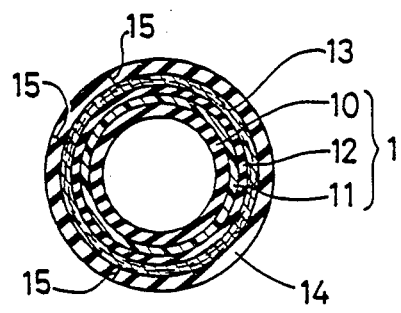
FIG. 1 is a transverse cross sectional view of one embodiment of the refrigerant transporting hose of the present invention.
Figure 9:
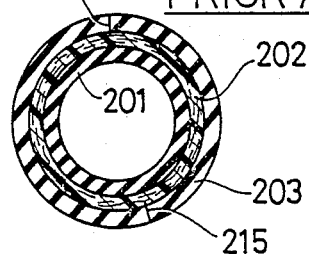
FIGS. 9 and 10 are views showing conventional refrigerant transporting hoses.

Referring to FIG. 1, there is shown a refrigerant transporting hose in accordance with the present invention which consists of an inner rubber layer 10, an intermediate resinous layer 11 formed of a blend material of modified polyolefin and polyamide (which will be described below in detail), an outer rubber layer 12, a reinforcing fiber layer 13 and an outer rubber tube 14. Reference numerals 15 designate spiking holes which are formed through the outer rubber tube 14 so as to communicate the reinforcing fiber layer 13 with outside space. The inner and outer rubber layers 10, 12 and the intermediate resinous layer 11 constitutes an inner tube 1, which corresponds to the inner rubber tube 201 of the prior art hose of FIG. 9.

The inner rubber layer 10 has rubber elasticity and provides the hose with a high seal characteristic, whereby the hose can be connected with high gas tightness to a nipple or other joints. Additionally, the inner rubber layer 10 serves to protect the intermediate resinous layer 11 from deterioration under the influence of metallic piping or other metallic parts.

The outer rubber layer 12 has rubber elasticity and serves to elastically support the intermediate resinous layer 11.

The inner and outer rubber layers 10, 12 are formed of a rubber material as commonly used for forming an inner portion of refrigerant transporting hoses, such as acrylonitrile-butadiene rubber (NBR), chlorosulfonated or chlorosulfonyl polyethylene (CSM), chlorinated polyethylene (CPE), epichlorohydrin rubber (CHC, CHR), chloroprene rubber CR) or chlorinated isobutylene-isoprene rubber (Cl-IIR).

The intermediate resinous layer 11 is formed of a blend material of modified polyolefin and polyamide. Thus, the resinous layer 11 has a high flexibility together with a considerably high resistance to gas permeation. Regarding the resistance to gas permeation, the resinous layer 11 is slightly inferior to the prior art polyamide resin layer (see FIG. 10). However, since the flexibility of the resinous layer 11 is high as described above, the relatively low resistance to gas permeation of the resinous layer 11 can be compensated for by using the resinous layer 11 with increased thickness, without deteriorating the overall flexibility of the hose.

The modified polyolefine used for preparing the blend material for the intermediate resinous layer 11 is produced by copolymerization of (i) at least one olefin monomer of ethylene and propylene as a main component, and (ii) at least one comonomer selected from ethylenically unsaturated carboxylic acid or its derivative. As the ethylenically unsaturated carboxylic acid, preferably are used ethylenically unsaturated monocarboxylic acid such as acrylic acid and methacrylic acid, or ethylenically unsaturated dicarboxylic acid such as maleic acid and fumaric acid. As the derivative of the ethylenically unsaturated carboxylic acid, preferably is used acid anhydride, amide, ester or acid chloride thereof. Alternatively, the modified polyolefin may be a graft polymer of polyolefin and ethylenically unsaturated carboxylic acid or its derivative as indicated above, or be a reaction product of polyolefin and carboxylic acid or its derivative.

It is recommended that, where the modified polyolefin is the copolymer of the olefin monomer (i) and the comonomer (ii), the copolymer contains 0.1–20% by mole of the comonomer (ii). Meanwhile, where the modified polyolefin is the graft copolymer or the reaction product as indicated above, the graft polymer or reaction product preferably contains 0.1–20% by mole of the graft monomer or the reaction agent as indicated above, respectively.

As the polyamide resin for the blend material, preferably is used nylon 6, nylon 66 or copolymer of nylon 6 and nylon 66.

From the standpoint of the balance between the flexibility and the resistance to gas permeation, it is recommended that the ratio of (A) the modified polyolefin by weight to (B) the polyamide resin by weight in the blend material for the resinous layer 11, fall within the range of (A)/(B)=30/70 to 70/30.

The reinforcing fiber layer 13 is formed of a fiber material as typically used for producing hoses, such as polyester fiber, aramid fiber or other synthetic or natural fiber material. The fiber layer 13 is formed on the outer rubber layer 12 by braiding, spiralling or knitting using such fiber material.

The outer rubber tube 14 is exposed to the outside space. From the standpoint of weather resistance, heat resistance and water permeability, the outer rubber tube 14 preferably is formed of EPDM. However, other materials may be used for forming the outer rubber tube 14.

There will be described a method of manufacturing the refrigerant transporting hose having the above-described laminated structure.

Initially, unvulcanized rubber composition is extruded from an extruder (not shown) so as to form an inner rubber layer 10 on a rubber mandrel (not shown).

Next, resin-type adhesive dissolved in a solvent is applied to the outer surface of the unvulcanized inner rubber layer 10, and subsequently heat-plasticized resinous material is extruded on the applied adhesive so as to form an intermediate resinous layer 11.

Further, resin-type adhesive is applied to the outer surface of the resinous layer 11, and unvulcanized rubber composition is extruded so as to form an outer rubber layer 12. Thus, the three-laminated tubular body is obtained.

Next, rubber adhesive is applied to the outer surface of the outer rubber layer 12, and subsequently a reinforcing fiber layer 13 is formed on the outer surface of the outer rubber layer 12 by braiding, spiralling or knitting using suitable fiber material.

Further, rubber adhesive is applied to the outer surface of the reinforcing fiber layer 12, and unvulcanized rubber composition is extruded thereon so as to form an outer rubber tube 14.

Last, the thus-obtained laminated tubular intermediate product (10, 11, 12, 13, 14) is vulcanized to produce an integrally bonded end product (hose), and the rubber mandrel is removed from the hose. The vulcanizing temperature is selected at 145° to 170° C., and the vulcanizing period is selected at 30 to 90 minutes.

In the above-described manufacturing method, the thickness of the inner rubber layer 10 is selected at 0.3 to 1 mm, more advantageously about 0.5 mm. If the thickness of the inner rubber layer 10 is below the lower limit of the above-indicated range, the seal characteristic of the hose is deteriorated. On the other hand, if the thickness exceeds the upper limit of the range, the outer diameter of the inner rubber layer 10 is increased, which leads to increasing the outer diameter of the intermediate resinous layer 11 to be formed outside the inner rubber layer 10, whereby the rigidity of the resinous layer 11 is raised. The resinous layer 11 with the raised rigidity would provide a higher bending resistance, thereby deteriorating the overall flexibility of the refrigerant transporting hose.

The thickness of the intermediate resinous layer 11 is selected at 0.1 to 2.5 mm, more advantageously 0.4 to 0.8 mm. If the thickness is lower than the lower limit of the above-indicated range, the resistance to gas permeation of the resinous layer 11 is decreased, thereby increasing the tendency to permit the refrigerant gas to permeate therethrough toward the outside space. Conversely, if the thickness exceeds the upper limit of the range, the rigidity of the resinous layer 11 is increased, whereby the overall flexibility of the hose is reduced.

The outer rubber layer 12 is required to elastically protect the intermediate resinous layer 11. Accordingly, the thickness of the outer rubber layer 12 is selected at 1 to 3 mm, preferably about 2 mm.

The thickness of the outer rubber tube 14 is selected at 1 to 2.5 mm, preferably about 1.4 mm. For improving the resistance to water permeation of the outer rubber tube 14, it is recommended that the outer rubber tube 4 be thick. However, if the thickness exceeds the upper limit of the above-indicated range, the ease to handle the hose is deteriorated.

Figure 4:
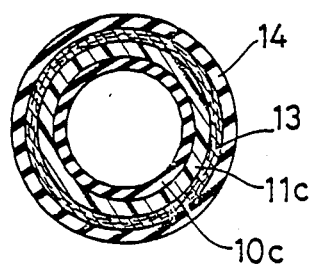
FIGS. 2 through 4 are views corresponding to FIG. 1, showing modified forms of the hose of FIG. 1.
Figure 2:
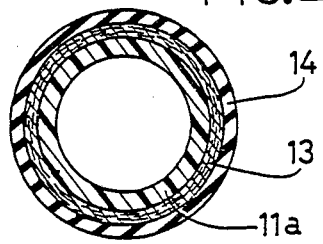
Figure 3:
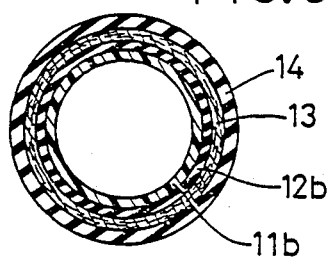

Referring next to FIGS. 2 to 4, there are shown three modified forms of the hose of FIG. 1.

In the hose of FIG. 2, an inner tube thereof which corresponds to the inner tube 1 of the hose of FIG. 1, is constituted solely by a resinous layer 11a formed of a blend of modified polyolefin and polyamide similar to that for the intermediate resinous layer 11 of the hose of FIG. 1. In other words, the present hose does not have any rubber layers corresponding to the inner and outer rubber layers 10, 12 of the hose of FIG. 1.

The hose of FIG. 3 has an innermost resinous layer 11b formed of a blend of modified polyolefin and polyamide resin similar to that for the intermediate resinous layer 11 of the hose of FIG. 1, and an outer rubber layer 12b corresponding to the outer rubber layer 12 of the hose of FIG. 1. However, the instant hose does not have a layer corresponding to the inner rubber layer 10 of FIG. 1. Accordingly, the innermost resinous layer 11b is exposed to refrigerant gas conducted through the hose, similar to the resinous layer 11a of the hose of FIG. 2.

The hose of FIG. 4 has a resinous layer 11c formed of a blend of modified polyolefin and polyamide like that for the intermediate resinous layer 11 of the hose of FIG. 1, and an inner rubber layer 10c corresponding to the inner rubber layer 10 of FIG. 1. However, the present hose does not have a layer corresponding to the outer rubber layer 12 of FIG. 1. Accordingly, a reinforcing fiber layer 13 is formed directly on the outer surface of the resinous layer 11c.

The refrigerant transporting hoses of FIGS. 2-4 have a simpler construction as compared with the hose of FIG. 1, and therefore are manufactured at lower cost. Each of the hoses of FIGS. 2-4 finds its specific application or use according to its specific structural feature. It goes without saying that each of the modified hoses has a high flexibility as well as a high resistance to gas permeation therethrough, like the hose of FIG. 1.

As is apparent from the foregoing, all the refrigerant transporting hoses of FIGS. 1 through 4 have an excellent flexibility as well as an excellent resistance to gas permeation. Therefore, those hoses are suitable for use as piping for car coolers, air conditioners and other automotive devices which piping is required to maintain an excellent seal characteristic together with a high resistance to gas permeation for a long period of time.

EXAMPLE I

In TABLE I there are shown four invention hoses (Hoses 1 through 4) and two comparative hoses (Hoses 5 and 6). Two sorts of blend materials were prepared according to the principle of the present invention so as to be used as material for forming the intermediate resinous layers of the inner tubes of Invention Hoses 1–4. First blend material for Hoses 1–3 was prepared by blending nylon 6 and first modified polypropylene which is produced by graft copolymerization of maleic anhydride with polypropylene. Second blend material for Hose 4 is prepared by blending nylon 6 and second modified polypropylene which is produced by reaction of polypropylene and derivative of phthalic anhydride. The ratio by weight of the nylon 6 to the first or second modified polypropylene in the blend for each of Hoses 1–4 is indicated in the table. All the hoses Invention Hoses 1–4 and Comparative Hoses 5, 6) were produced by the previously-described method using the respective materials indicated in the table.

TABLE I

|  |  |  | INVENTION HOSES | | | | COMPARATIVE HOSES | |
|---|---|---|---|---|---|---|---|---|
|  |  |  | 1 | 2 | 3 | 4 | 5 | 6 |
| INNER TUBE | INNER RUBBER LAYER | MATERIAL | NBR | CSM | CSM | NBR | NBR | NBR |
|  |  | THICKNESS (mm) | 0.5 | 0.5 | 0.5 | 0.5 | 0.5 | 0.5 |
|  | INTERMEDIATE RESINOUS LAYER | MATERIAL | Ny6/MPP1 *1 | Ny6/MPP1 | Ny6/MPP1 | Ny6/MPP2 *2 | Ny6 | Ny6 |
|  |  | WEIGHT RATIO *3 | 70/30 | 30/70 | 50/50 | 70/30 | — | — |
|  |  | THICKNESS (mm) | 0.4 | 0.8 | 0.6 | 0.4 | 0.2 | 0.5 |
|  | OUTER RUBBER LAYER | MATERIAL | EPDM | EPDM | EPDM | EPDM | EPDM | EPDM |
|  |  | THICKNESS (mm) | 2.0 | 2.0 | 2.0 | 2.0 | 2.0 | 2.0 |
| REINFORCING FIBER LAYER |  | MATERIAL | PEF *4 | PEF | PEF | PEF | PEF | PEF |
| OUTER RUBBER TUBE |  | MATERIAL | EPDM | EPDM | EPDM | EPDM | EPDM | EPDM |
|  |  | THICKNESS (mm) | 1.4 | 1.4 | 1.4 | 1.4 | 1.4 | 1.4 |

*1(MPP1): Polypropylene modified with maleic anhydride
*2(MPP2): Polypropylene modified with phthalic anhydride
*3(WEIGHT RATIO): Ratio by weight of the nylon 6 (Ny6) to the modified polypropylene of blends
*4(PEF): Polyester fiber The Hoses 1–6 were evaluated regarding flexibility and resistance to gas permeation, by the tests described below. The test results are shown in TABLE II.

Flexibility Test

Each hose was cut into a 300 mm and a 400 mm long test piece. Each test piece was fixed at one of opposite ends thereof to a horizontal plate, and subsequently was bent with the other end thereof subjected to force. A value of the force at which the other end of the hose reached the horizontal plate, was measured as bending stress of the test piece. Lower bending stress indicates higher flexibility of the hoses.

Gas Permeation-Resistance Test

Each hose was cut into a 500 mm long test piece, and subsequently the test piece was charged with 40 g of Freon 12 (R12) and gas-tightly sealed at opposite ends thereof. After the Freon charged test piece was maintained for 72 hours, an overall weight of the test piece was measured to be compared with that before the 72 hours, whereby the weight of a lost portion of the Freon which had permeated through the hose into the outside space, was calculated. Less amount of lost Freon indicates higher resistance to gas permeation of the hoses.

TABLE II

|  |  | INVENTION HOSES | | | | COMPARATIVE HOSES | |
|---|---|---|---|---|---|---|---|
|  |  | 1 | 2 | 3 | 4 | 5 | 6 |
| BENDING STRESS (kgf) | 300 mm LONG HOSE | 1.1 | 1.2 | 1.1 | 1.1 | 1.5 | KINKED *1 |
|  | 400 mm LONG HOSE | 0.7 | 0.8 | 0.7 | 0.7 | 1.0 | KINKED |
| LOST FREON (g/m/72hr) |  | 1.9 | 2.2 | 2.0 | 1.9 | 2.0 | 1.0 |

*1 (KINKED): The test piece (hose) was kinked.

As is apparent from the test results shown in TABLE II, all of the invention hoses (Hoses 1–4) have an excellent flexibility as well as an excellent resistance to gas permeation. In contrast thereto, the comparative hose (Hose 6) having the 0.5 mm thick polyamide resin (nylon 6) intermediate layer, suffers from deteriorated flexibility, though the Hose 5 having the 0.2 mm thick polyamide resin layer provides no problem. The deteriorated flexibility of the Hose 6 was demonstrated by a kink (buckle) caused therein in the test. The Hose 6 was folded in two due to the kink and was unable to restore its original configuration.

Figure 5:
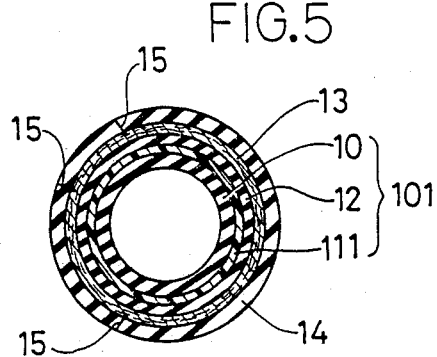
FIG. 5 is a transverse cross sectional view of another embodiment of the refrigerant transporting hose of the present invention.

Referring to FIG. 5, there is shown another embodiment of the refrigerant transporting hose of the present invention. The hose of FIG. 5 is similar to the hose of FIG. 1, except for an intermediate resinous layer 111 which is formed of a material different from that for the corresponding intermediate resinous layer 11 of the hose of FIG. 1. The same reference numerals as used in the embodiment of FIG. 1 are used to designate the corresponding elements of the instant embodiment of FIG. 5. Repetitive description of the elements other than the intermediate resinous layer 111 are omitted in the following description regarding the hose of FIG. 5.

The intermediate resinous layer 111 of the instant hose is formed of a reaction product produced by block copolymerization or graft copolymerization of polyamide and polyolefin whose molecular chain has a pair of functional groups at both terminals (ends) thereof. It is preferred that the polyolefin be produced by polymerization of ethylene or propylene, or copolymerization of ethylene and propylene. As the polyamide, preferably is used nylon 6, nylon 66 or nylon 6-nylon 66 copolymer. It is recommended that the functional groups of the molecular chain of the polyolefin consists of hydroxyl group, carboxyl group or isocyanate group. Those functional groups of the polyolefin molecules are utilized to produce the block copolymer or graft copolymer as the material for the intermediate resinous layer 111 of the instant hose.

Figure 10:
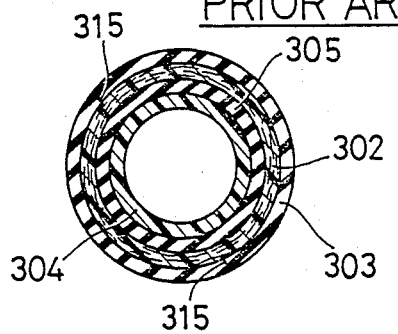

Being formed of the reaction product of the polyamide and the polyolefin, the intermediate resinous layer 111 has a high flexibility as contrasted with polyamide resin conventionally used as material for a layer located at an inner portion of a refrigerant transporting hose (see FIG. 10). Moreover, the resinous layer 111 has an excellent resistance to gas permeation therethrough. Regarding the resistance to gas permeation, however, the resinous layer 111 of the instant hose is slightly inferior to the conventional polyamide resin layer. Since the resinous layer 111 has a high flexibility, the comparatively low resistance to gas permeation of the resinous layer 111 can be compensated for by increasing the thickness thereof, without deteriorating the overall flexibility of the hose.

As previously described, the material for the intermediate resinous layer 111 is prepared, for instance, by block copolymerization or graft copolymerization of modified polyolefin such as modified polyethylene having hydroxyl, carboxyl or isocyanate group at each of both terminals (ends) of the molecular chain thereof, and polyamide such as nylon 6, nylon 66 or nylon 6-nylon 66 copolymer. The ratio of an amount of the modified polyolefin to an amount of the polyamide greatly influences the flexibility, resistance to gas permeation and other characteristics of the reaction product or the resinous layer 111. More specifically described, as the proportion of the polyolefin to the polyamide is increased, the flexibility of the resinous layer 111 is increased, but the resistance to gas permeation of the same is reduced. On the other hand, as the proportion of the polyolefin to the polyamide is decreased, the resistance to gas permeation of the resinous layer 111 is improved, but the flexibility of the same is decreased.

Accordingly, it is recommended that the ratio by weight of (C) the modified polyolefin to (D) the polyamide, both in a state of raw material, be within the range of (C)/(D)=30/70 to 70/30.

The thickness of the intermediate resinous layer 111 is selected at 0.1 to 2.5 mm, preferably 0.4 to 0.8 mm. If the thickness is below the lower limit of the range, the resinous layer 111 has an increased tendency to permit the refrigerant gas such as Freon to permeate therethrough into the outside space. On the other hand, if the thickness exceeds the upper limit of the range, the rigidity of the layer 111 adversely is increased, whereby the hose has a higher bending resistance and the overall flexibility of the hose is deteriorated.

Figure 8:
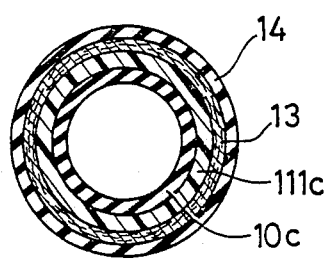
FIGS. 6 through 8 are views corresponding to FIG. 5, showing modified forms of the hose of FIG. 5.
Figure 6:
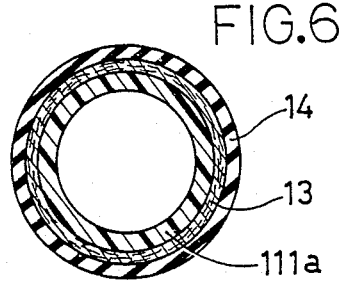
Figure 7:
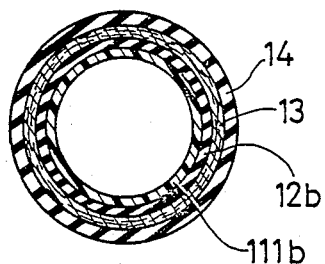

Referring to FIGS. 6-8, there are shown three modified forms of the hose of FIG. 5, which corresponds to the three modified forms shown in FIGS. 2-3 of the hose of FIG. 1, respectively. The same numerals as used in FIGS. 2-3 are used to designate the corresponding elements of the hoses of FIGS. 5-8. The resinous layers 111a, 111b, 111c of the hoses of FIGS. 6-8 are formed of a reaction product similar to that for the intermediate resinous layer 111 of the hose of FIG. 5.

The hose of FIG. 6 has the resinous layer 111a corresponding to the inner tube 101 of the hose of FIG. 5, but does not have any layers corresponding to the inner and outer rubber layers 10, 12 of the inner tube 101 of FIG. 5.

The hose of FIG. 7 has the innermost resinous layer 111b, and an outer rubber layer 12b corresponding to the outer rubber layer 12 of the hose of FIG. 5. However, the instant hose does not have a layer corresponding to the inner rubber layer 10 of FIG. 5.

Accordingly, each of the resinous layers 111a, 111b of the hoses of FIGS. 6 and 7 is exposed directly to the refrigerant gas conducted through the hose.

The hose of FIG. 8 has the inner rubber layer 10c corresponding to the inner rubber layer 10 of the hose of FIG. 5, and the resinous layer 111c. However, the hose does not have a layer corresponding to the outer rubber layer 12 of FIG. 5. Accordingly, a reinforcing fiber layer 13 is formed directly on the resinous layer 111c.

The refrigerant transporting hoses have a simpler structure as compared with the hose of FIG. 5, and accordingly can be manufactured at lower cost. Each of those hoses finds its specific application or use according to its specific structural feature.

It goes without saying that all of the hoses of FIGS. 6-8 have an excellent flexibility together with an excellent resistance to gas permeation, like the hose of FIG. 5.

Since the hoses of FIGS. 5-8 have the resinous layer (111, 111a, 111b, 111c) formed of the reaction product of polyolefin and polyamide, the hoses are suitable for use as refrigerant transporting piping for car coolers or other automotive devices which piping is required to maintain an excellent seal characteristic as well as a high resistance to gas permeation for a long period of time.

EXAMPLE II

In TABLE III there are shown three invention hoses (Hoses 7 through 9) and two comparative hoses (Hoses 10 and 11). Modified polyethylene having a carboxyl group at each of both ends of the molecular chain thereof, and nylon 6 were mixed and copolymerized so as to obtain reaction product (polyethylene-nylon 6 copolymer) to be used as material for the intermediate resinous layer of each of the invention hoses (Hoses 7-9). The ratio by weight of the modified polyethylene to the nylon 6 in the mixture for each of Invention Hoses 7-9 is indicated in the table. All the hoses (Invention Hoses 7-9 and Comparative Hoses 10, 11) were manufactured by a method similar to the method for the hose of FIG. 1 and by using the respective materials indicated in the table.

TABLE III

| | | | INVENTION HOSES | | | COMPARATIVE HOSES | |
|---|---|---|---|---|---|---|---|
| | | | 7 | 8 | 9 | 10 | 11 |
| INNER TUBE | INNER RUBBER LAYER | MATERIAL | NBR | CSM | CSM | NBR | NBR |
| | | THICKNESS (mm) | 0.5 | 0.5 | 0.5 | 0.5 | 0.5 |
| | INTER-MEDIATE RESIN-OUS LAYER | MATERIAL | MPE/Ny6 *1 | MPE/Ny6 | MPE/Ny6 | Ny6 | Ny6 |
| | | WEIGHT RATIO *2 | 70/30 | 30/70 | 50/50 | — | — |
| | | THICKNESS (mm) | 0.4 | 0.8 | 0.6 | 0.2 | 0.5 |
| | OUTER RUBBER LAYER | MATERIAL | EPDM | EPDM | EPDM | EPDM | EPDM |
| | | THICKNESS (mm) | 2.0 | 2.0 | 2.0 | 2.0 | 2.0 |
| REINFORCING FIBER LAYER | | MATERIAL | PEF *3 | PEF | PEF | PEF | PEF |
| OUTER RUBBER TUBE | | MATERIAL | EPDM | EPDM | EPDM | EPDM | EPDM |
| | | THICKNESS (mm) | 1.4 | 1.4 | 1.4 | 1.4 | 1.4 |

*1(MPE): Modified polyethylene having a carboxyl group at each of both ends of the molecular chain thereof
*2(WEIGHT RATIO): Ratio by weight of the modified polyethylene to the nylon 6 (Ny6)
*3(PEF): Polyester Fiber The Hoses 7-11 were evaluated regarding flexibility and resistance to gas permeation, by conducting the same tests as previously described regarding the Hoses 1-6 of the hose of FIG. 1. The test results are shown in TABLE IV. In the table, lower bending stress indicates higher flexibility of the hoses, while less amount of lost Freon indicates higher resistance to gas permeation of the hoses.

TABLE IV

| | | INVENTION HOSES | | | COMPARATIVE HOSES | |
|---|---|---|---|---|---|---|
| | | 7 | 8 | 9 | 10 | 11 |
| BENDING STRESS (kgf) | 300 mm LONG HOSE | 1.1 | 1.2 | 1.2 | 1.5 | KINKED *1 |
| | 400 mm LONG HOSE | 0.7 | 0.8 | 0.7 | 1.0 | KINKED |
| LOST FREON (g/m/72hr) | | 1.9 | 2.2 | 2.0 | 2.0 | 1.0 |

*1(KINKED): The test piece (hose) was kinked.

As is apparent from the test results shown in TABLE IV, all of the invention hoses (Hoses 7-9) have an excellent flexibility together with an excellent resistance to gas permeation therethrough. In contrast thereto, the comparative hose (Hose 11) having the 0.5 mm thick polyamide resin (nylon 6) intermediate layer, suffers from deteriorated flexibility, though the comparative hose (Hose 10) having the 0.2 mm thick polyamide resin layer involves no problem. The deteriorated flexibility of the Hose 11 was demonstrated by a kink (buckle) caused therein in the test. The Hose 11 was folded in two due to the kink and was unable to restore its original configuration.

While the present invention has been described in detail with a certain degree of particularity, it is to be understood that the invention is not limited to the precise details of the illustrated embodiments, but may be embodied with various changes, improvements and modifications, which may occur to those skilled in the art, without departing from the spirit and scope of the invention defined in the following claims.

What is claimed is:

1. A refrigerant transporting hose comprising:
    an inner tube;
    an outer tube of a rubber material located radially outwardly of said inner tube, said outer tube having a thickness of 1 to 2.5 mm; and
    a reinforcing fiber layer interposed between said inner and outer tubes, such that said reinforcing fiber layer is adhesively bonded to the inner and outer tubes to constitute an integral tubular body,
    said inner tube including a resinous layer formed of a blend of modified polyolefin and polyamide resin, said modified polyolefin being selected from the group consisting of (i) a copolymer of olefin monomer and comonomer selected from ethylenically unsaturated carboxylic acid and its derivative, (ii) graft copolymer of polyolefin and graft monomer selected from ethylenically unsaturated carboxylic acid and its derivative, and (iii) reaction product of polyolefin and reaction agent selected from carboxylic acid and its derivative, said copolymer, graft copolymer or reaction product having 0.1 to 20% by mole of said comonomer, graft monomer or reaction agent, respectively, a ratio by weight of said modified polyolefin to said polyamide resin being within a range of 30/70 to 70/30 , said resinous layer having a thickness of 0.1 to 2.5 mm,
    said inner tube further including an innermost layer of a rubber material located radially inwardly of said resinous layer, said innermost layer and said resinous layer being adhesively bonded to each other, said innermost layer having a thickness of 0.3 to 1 mm.

2. The hose as set forth in claim 1, wherein said polyamide resin comprises nylon 6, nylon 66 or nylon 6-nylon 66 copolymer.

3. The hose as set forth in claim 1, wherein said resinous layer of said inner tube has a thickness of 0.4 to 0.8 mm.

4. A refrigerant transpaorting hose comprising:
an inner tube;
an outer tube of a rubber material located radially outwardly of said inner tube, said outer tube having a thickness of 1 to 2.5 mm; and
a reinforcing fiber layer interposed between said inner and outer tubes, such that said reinforcing fiber layer is adhesively bonded to the inner and outer tubes to constitute an integral tubular body,
said inner tube including a resinous layer formed of a reaction product of polyamide, and polyolefin whose molecular chain has a pair of functional groups at both ends thereof, said functional groups being selected from the group consisting of hydroxyl group, carboxyl group and isocyanate group, a ratio by weight of said polyolefin to said polyamide being within a range of 30/70 to 70/30, said resinous layer having a thickness of 0.1 to 2.5 mm,
said inner tube further including an innermost layer of a rubber material located radially inwardly of said resinous layer, said innermost layer and said resinous layer being adhesively bonded to each other, said innermost layer having a thickness of 0.3 to 1 mm.

5. The hose as set forth in claim 4, wherein said polyolefin comprises polyethylene, polypropylene or ethylene-propylene copolymer.

6. The hose as set forth in claim 4, wherein said polyamide comprises nylon 6, nylon 66 or nylon 6-nylon 66 copolymer.

7. The hose as set forth in claim 4, wherein said resinous layer of said inner tube has a thickness of 0.4 to 0.8 mm.

8. The hose as set forth in claim 1, wherein said inner tube further includes an outer layer of a rubber material located radially outwardly of said resinous layer, said outer rubber layer and said resinous layer being adhesively bonded to each other, said outer rubber layer having a thickness of 1 to 3 mm.

9. The hose as set forth in claim 4, wherein said inner tube further includes an outer layer of a rubber material located radially outwardly of said resinous layer, said outer rubber layer and said resinous layer being adhesively bonded to each other, said outer rubber layer having a thickness of 1 to 3 mm.

* * * * *